United States Patent [19]
Li et al.

[11] Patent Number: 6,055,347
[45] Date of Patent: Apr. 25, 2000

[54] MULTI-PASS OPTICAL FILTER

[76] Inventors: Jinghui Li, 30 Juniper Crescent, Ottawa, Ontario, Canada, K2E 5M6; Neil Teitelbaum, 834 Colonel By Drive, Ottawa, Ontario, Canada, K1S 5C4

[21] Appl. No.: 08/917,567

[22] Filed: Aug. 26, 1997

[51] Int. Cl.[7] ........................................................... G02B 6/32
[52] U.S. Cl. ........................... 385/34; 385/24; 385/74
[58] Field of Search ................................. 385/24, 33, 34, 385/66, 84, 74

[56] References Cited

U.S. PATENT DOCUMENTS

| | | | |
|---|---|---|---|
| 5,612,824 | 3/1997 | Si et al. | 359/652 |
| 5,629,995 | 5/1997 | Duck et al. | 385/24 |
| 5,652,814 | 7/1997 | Pan et al. | 385/24 |
| 5,796,889 | 8/1998 | Xu et al. | 385/24 |

*Primary Examiner*—Hung N. Ngo
*Attorney, Agent, or Firm*—Neil Teitelbaum & Associates

[57] ABSTRACT

An optical filter is provided having first and second graded index (GRIN) lenses preferably disposed in a coaxial relationship so that they have a common optical axis. Each of the GRIN lenses has an end face providing a port at predetermined location. The ports are disposed on opposite sides of the optical axis and each of the ports is substantially equidistant from the optical axis, so as to be oppositely offset from the optical axis by a same amount. The filter also includes an optical interference filter disposed between other end faces of the first and second graded index lenses. By providing at least four spaced ports, equidistant from the optical axis, such that two ports form a first couplet on opposite sides of the axis from each other and such that two other ports form a second couplet on opposite sides of the axis from each other, wherein one of the ports of one couplet is optically coupled with one of the ports from the other couplet, an add and drop circuit may be realized. The notion of multi-use of an optical filter applies not only to an add and drop circuit, but also other WDM devices which use several optical filters of a same type.

17 Claims, 6 Drawing Sheets

Or

Or

MULTI-PASS OPTICAL FILTER

FIELD OF THE INVENTION

This invention relates generally to an optical coupler and more particularly to an optical coupler that allows re-filtering of a launched optical signal through a same filter a plurality of times.

BACKGROUND OF THE INVENTION

There have been many attempts to develop compact, high precision, low tolerance narrow band optical filters centered at predetermined wavelengths for application in areas such as spectroscopy, optical networks and optical links, and more particularly optical communication systems. Optical filters are some of the most ubiquitous of all passive optical components found in most optical communication systems. One use of optical filters is in the field of optical communications where only a signal of a predetermined wavelength is to be passed.

Although this invention is particularly useful with narrow band optical filters, it is not limited to filters which pass only a very narrow band of light (e.g. ±0.25 nanometers or less) centered at a predetermined wavelength; however, since such filters are extremely difficult to make and consequently relatively expensive to manufacture the applicability of this invention for the narrow band is evident. Thus, re-using a filter of this type in accordance with the teachings of this invention has significant advantages. One known means for providing a selective, narrow band, optical filter, is by utilizing a wavelength selective interference filter element whose wavelength characteristic depends on the angle of incidence. Thus, by varying the angle of light incident upon the interference filter, the wavelength of the light that is passed by the filter varies. Such a filter element is described in U.S. Pat. No. 5,331,651 issued Jul. 19, 1994 and assigned to the Hewlett-Packard Company. Another filter of this type is described in allowed U.S. patent application Ser. No. 08/442,365 in the name of Si assigned to JDS Fitel Inc. of Canada.

Since these high precision, low tolerance narrow band optical filters centered at predetermined wavelengths are very difficult and costly to make, it is an object of this invention to pass multiple beams through a small filter element a plurality of times in order to attempt to increase the usage of the filter or at least provide a more economical filtering system.

An optical coupler is a device that is used to transfer optical signals from at least one waveguide to another. An optical combiner is a device that combines more than one input signal into a single waveguide. The instant invention hereafter described applies to both couplers and combiners. Hence the term coupler is meant to encompass both types of devices and is meant to be interpreted broadly, to cover both terms.

A wavelength division multiplexing/demultiplexing (WDM) coupler transfers input optical signals from a plurality of input information channels to a plurality of output information channels in response to the wavelength of the input signals. A goal of any WDM coupler is that the crosstalk between channels is zero, i.e., that an untargeted output channel is effectively isolated from the signals on a targeted output channel, so that none of the output channels leak onto the untargeted channel.

FIG. 1 is a prior art representational block diagram of a WDM optical receiver system for separating an incoming optical signal as disclosed by Pan et al. and assigned to E-Tek Dynamics, Inc. The system comprises wavelengths of light $\lambda_{1,2,3,4,5,6,7,8}$ into eight separate channels. Although this device may achieve some channel separation, the single filtering of a particular optical signal in a cascaded filtering device has certain drawbacks. For example, in FIG. 1, the lensed optical filtering device 271 is designed to reflect light of wavelengths $\lambda_{1,2,3,4}$, and to pass light of wavelengths $\lambda_{5,6,7,8}$. However, with dichroic filters of this type, it has been found that a small percentage of signal light of wavelength $\lambda_{1,2,3,4}$ is not reflected and passes through conventional filters such as 271, thereby not providing enough isolation between channels to meet certain requirements. This problem becomes exacerbated when subsequent filtering is not provided to eliminate small leakage of unwanted wavelengths. For example, in FIG. 1, when perfect separation of wavelengths $\lambda 1$ and $\lambda 2$ is not provided by filter 274, some light of wavelength $\lambda 1$ will leak into the separated light of wavelength $\lambda 2$. Conversely some light of wavelength $\lambda 2$ will leak into the separated light of wavelength $\lambda 1$. Hence, a filtering arrangement is often preferred to achieve greater isolation between all or certain channels.

It is an object of this invention, to provide an optical system, wherein a single optical filter is used in a manner, which provides repeated filtering at least a same wavelength of an optical signal.

It is a further object of this invention to provide a less expensive coupler system that obviates some of the limitations of the prior art.

SUMMARY OF THE INVENTION

In accordance with the invention, there is provided, an optical filtering system comprising:
  a first GRIN lens having a first end face and a second end face;
  a plurality of ports at the first end face for launching light into or receiving light from the GRIN lens, said ports being spaced about an optical axis of the lens, at least four ports being disposed a same distance from the optical axis;
  a second GRIN lens disposed adjacent the first GRIN lens having a first end face and a second end face;
  an optical filter element disposed between the first and second GRIN lens; and,
  waveguide means for coupling one of the at least four ports at the first end face of the first GRIN lens with another of the at least four ports at the first end face of the GRIN lens.

In accordance with the invention, there is further provided, an optical filtering system comprising wavelength selective optical filter element having a wavelength characteristic dependent upon on an angle of incidence, having an input end face and an output end face;
  a first and second GRIN lens being spaced apart by the optical filter element, the first GRIN lens having an input end face having at least 4 ports, wherein first and third ports are configured as input ports, and second and fourth ports are configured as output ports, the first, second, third and fourth ports being spaced apart and equidistant from an optical axis of the first GRIN lens; and,
  and an optical waveguide disposed between the second and third ports for routing light from the second port to the third port for launching light received at the second port toward the optical filter element.

Advantageously, a single dichroic filter is used a repeatedly filter an optical signal a plurality of times.

Advantageously, at least two wavelengths of light may be repeatedly filtered by a single dichroic filter by providing groups of four or more input and output fibers spaced at least a first and second distance $d_1$ and $d_2$ from an optical axis of adjacent lens. In such an embodiment, two or more add and drop channels may be accommodated for.

BRIEF DESCRIPTION OF THE DRAWINGS

Exemplary embodiments of the invention will be described in conjunction with the drawings in which:

FIG. 3b is an end view of a GRIN lens of the optical filter shown in FIG. 3a;

DETAILED DESCRIPTION

Figure 1:
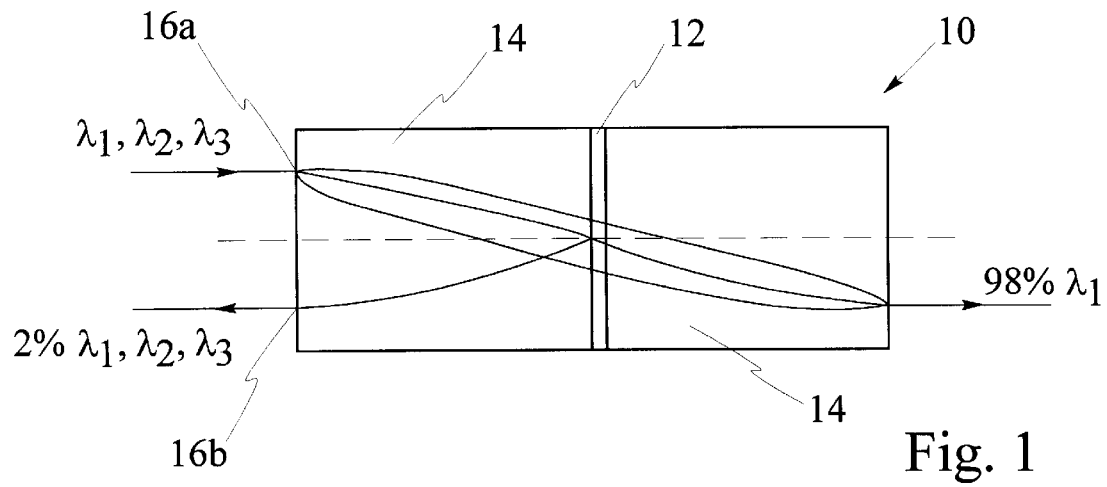
FIG. 1 is a prior art block diagram illustration of an optical coupler.

In the following description, it should be understood that same elements shown in different figures are assigned same reference numerals. Referring now to FIG. 1, an optical filter system is shown having a wavelength selective means 12 in the form of a narrow band interference filter; the interference filter 12 has a wavelength characteristic dependent upon on an angle o t of incidence. Adjacent and near to a first end face of the interference filter 12, is a GRIN lens 14 for collimating a beam comprising a plurality of wavelengths,λ1, λ2, and λ3 input from an optical fibre. Lenses of this type are produced under the trade name "SELFOC"; the mark is registered in Japan and owned by the Nippon Sheet and Glass Co. Ltd. The interference filter 12 is designed to pass a first wavelength of light incident said input end face at a first predetermined angle, and to pass other wavelengths of light incident upon said optical filter element at other predetermined angles. The other wavelengths of light incident upon the filter at the first predetermined angle are substantially reflected. A GRIN lens 14, provides the function of directing an input beam at a first input port 16a, comprised of wavelengths $\lambda_1$, $\lambda_2$, and $\lambda_3$, to the input end face of the interference filter 12 at a predetermined angle oU, that will allow light of wavelength $\lambda_1$ to pass therethrough, and that will ensure wavelengths $\lambda_2$ and $\lambda_3$ are reflected backwards towards a different port 16b an the input end face of the GRIN lens 14. Thus the filter 12 is designed to reflect other wavelengths outside of a very narrow band of light about the center wavelength $\lambda_1$. As is shown in FIG. 1, substantially most of the signal light energy about the wavelength λ1 (98%) is transmitted through the filter and a small portion (2%) is reflected as combined light with the other wavelengths λ2 and λ3.

Figure 2:
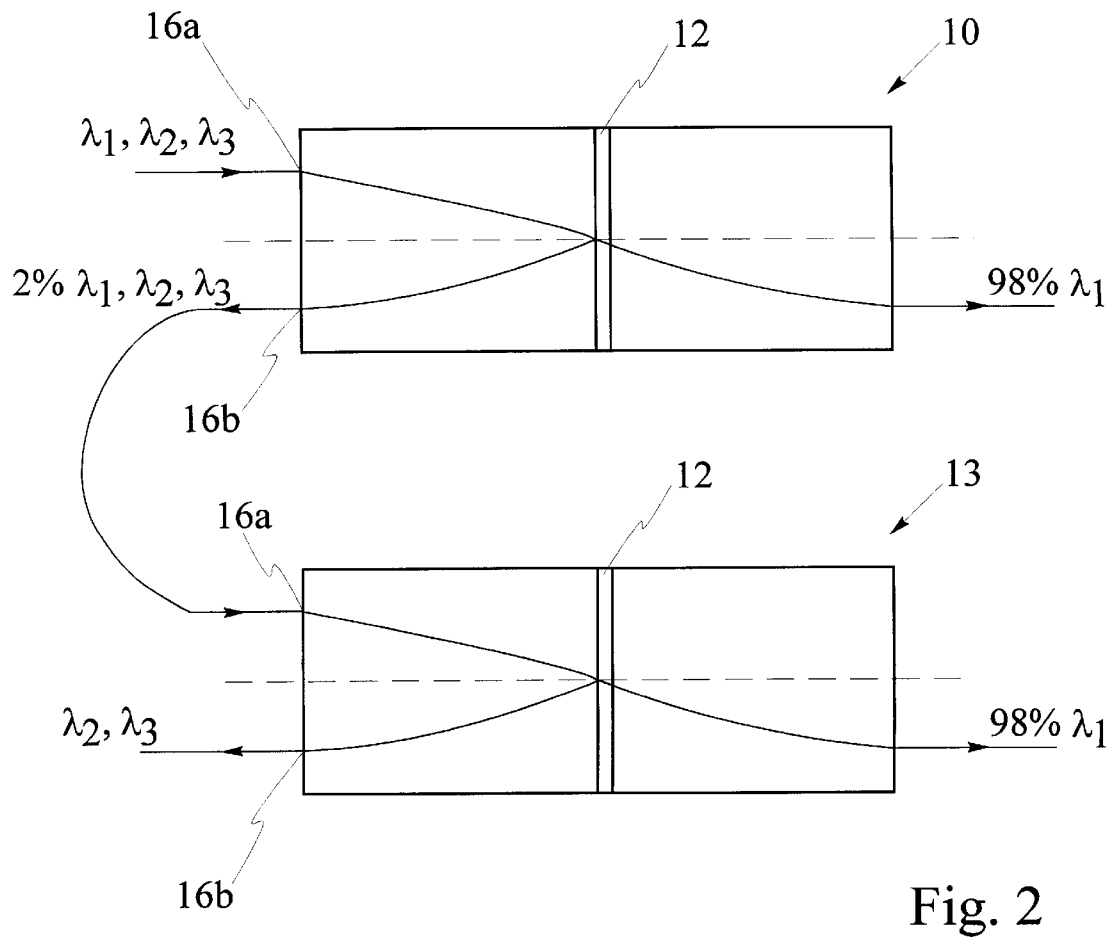
FIG. 2 is a detailed block diagram illustration of a prior art optical coupler wherein filtering twice is shown to provide increased isolation.

FIG. 2 illustrates and arrangement wherein two filters are cascaded, whereby the reflected output signal from the first filter system 10 is provided as an input signal to the second filter system 13. The small portion of signal light of wavelength λ1 that is reflected backwards is filtered a second time by the filter system 13, essentially removing any energy from the first channel corresponding to λ1 from the other two channels corresponding to wavelengths λ2 and λ3 at the reflected output of the filter system 13. This concept of twice filtering an optical signal to increase isolation between subsequent channels is well known.

One significant limitation of the optical circuit shown in FIG. 2 is the increased cost of providing two separate filters systems 10 and 13.

Figure 3A:
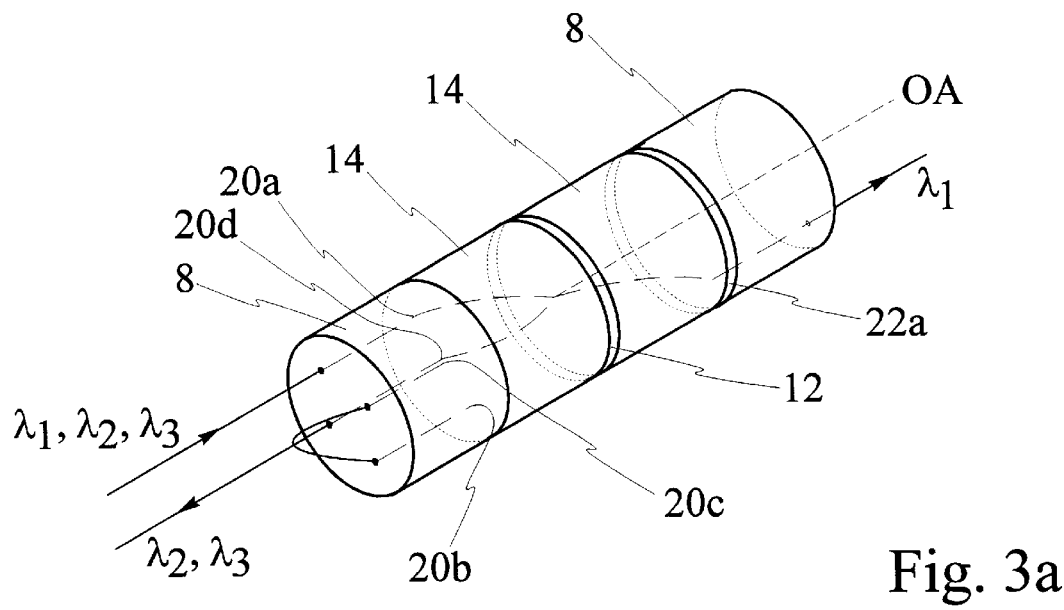
FIG. 3a is an diagrammatic view of optical filter in accordance with the invention, wherein four ports are arranged about an optical axis of a GRIN lens to achieve twice filtering of an optical signal.

Turning now to FIG. 3a, an alternative arrangement is shown, in accordance with the invention, wherein twice filtering an optical signal is accomplished by launching a signal reflected by the filter 12, back into the same input end face of the GRIN lens at a location 20c that is spaced from the input port 20a, but spaced a same distance from the optical axis of the lens. In FIG. 3a, two substantially quarter pitch GRIN lenses 14 are disposed back-to-back having a dichroic filter element 12 disposed therebetween. Optical fibre tubes, for example made of a ceramic material are disposed at outwardly facing ends of the lenses 14, for securely holding optical fibres in place. The positions of the ports 20a, 20b, 20c, and 20a are shown more clearly in FIG. 3b.

Figure 3B:
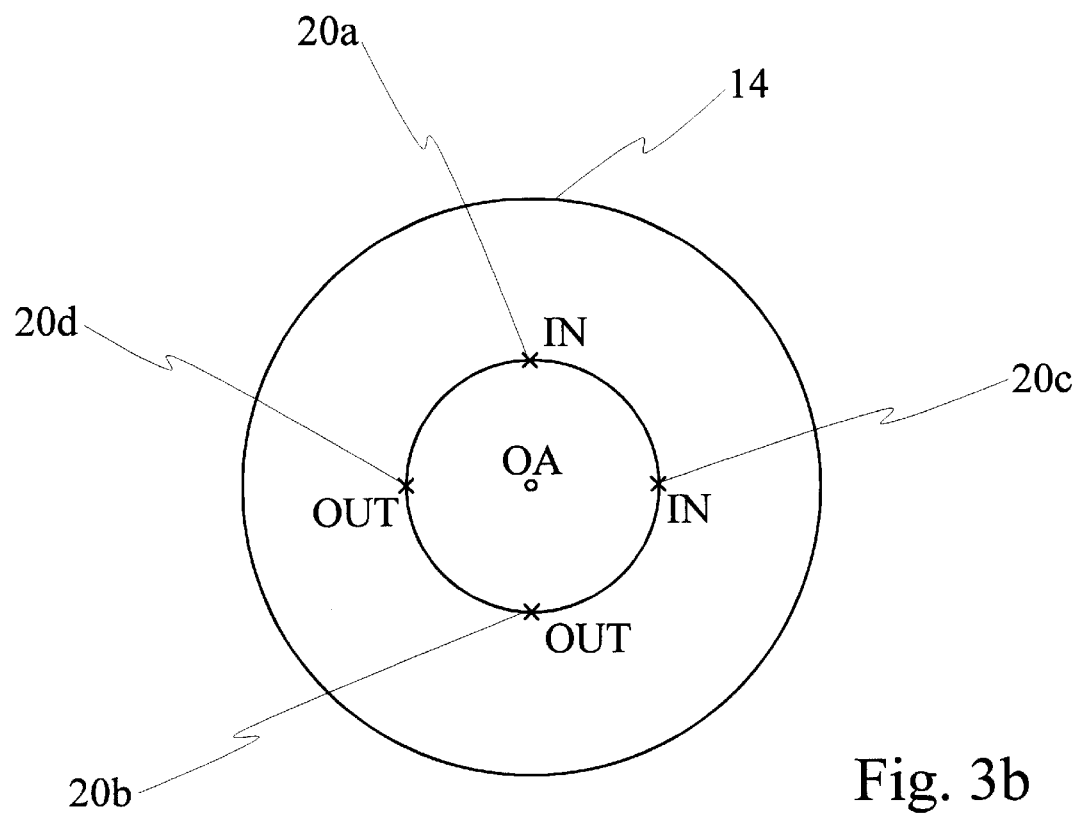

The basic operation of the optical circuit shown in FIGS. 3a and 3b will now be described. An input signal comprising wavelengths of light λ1, λ2, and λ3 corresponding to channels 1, 2 and 3 respectively, is launched into the input end face of the GRIN lens 14 at a first port 20a from an input optical fibre where it is directed toward the filter 12 at a first predetermined angle α1. Most of the light corresponding to channel 1 is passed through the filter 12 and exits an output port 22a and an end face of the second GRIN lens. Light that is reflected backwards consisting essentially of wavelengths λ2 and λ3 is routed through an optical fibre 22 from port 20b to port 20c, where it is once again directed at a same angle α1. Essentially any remaining signal energy of wavelength λ1 is passed through the filter 12 and the wavelengths of light λ2 and λ3 are reflected backwards to port 20d with a high degree of isolation from light corresponding to channel 1.

Figure 4A:
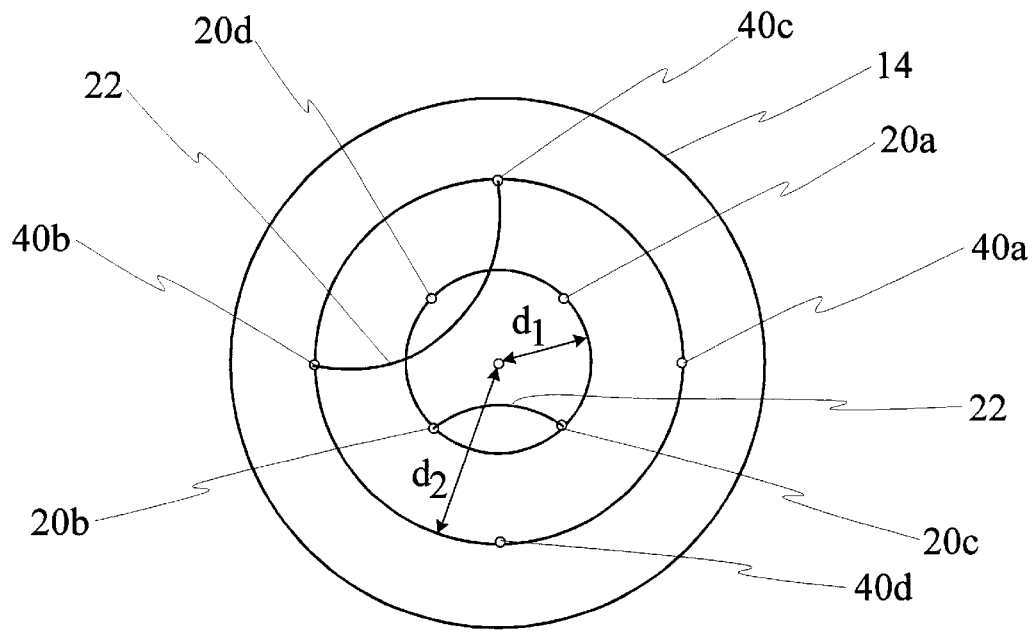
FIG. 4a an end view of an alternative embodiment similar to that of FIG. 3b, wherein twice filtering of two wavelengths is achieved.

Referring now to FIG. 4a, an end face of GRIN lens 14 is shown having ports 20a, 20b, 20c, 20a, 40a, 40b, 40c, and 40a. The lens 14 is part of an optical circuit similar to that of FIG. 3a, wherein the lens serves as a means of launching light at predetermined angles toward an optical filter element 12 (not shown). Conveniently, ports 20a and 20c are provided at a first predetermined distance $d_1$ from the optical axis of the GRIN lens 14 for launching light to the optical filter element 12 at a first predetermined angle α1. Further ports 40a and 40c are provided at a second predetermined distance $d_2$ for launching light to the optical filter element 12 at a second predetermined angle α2. Waveguides in the form of optical fibres are provided between ports 20b and 20c, and ports 40b and 40c for routing light exiting the GRIN lens back into the lens a second time. Light of wavelength λ1 passes through the filter when incident thereupon at an angle of α1, and light of wavelength λ2 passes through the filter when incident thereupon at an angle of λ2. Of course the twice filtered optical signal comprising substantially wavelength λ2 and λ3 can be routed into the port 40a, where wavelength λ2 can be dropped and twice filtered achieving a high degree of isolation from the wavelength λ3, or an added signal of wavelength λ3.

Figure 4B:
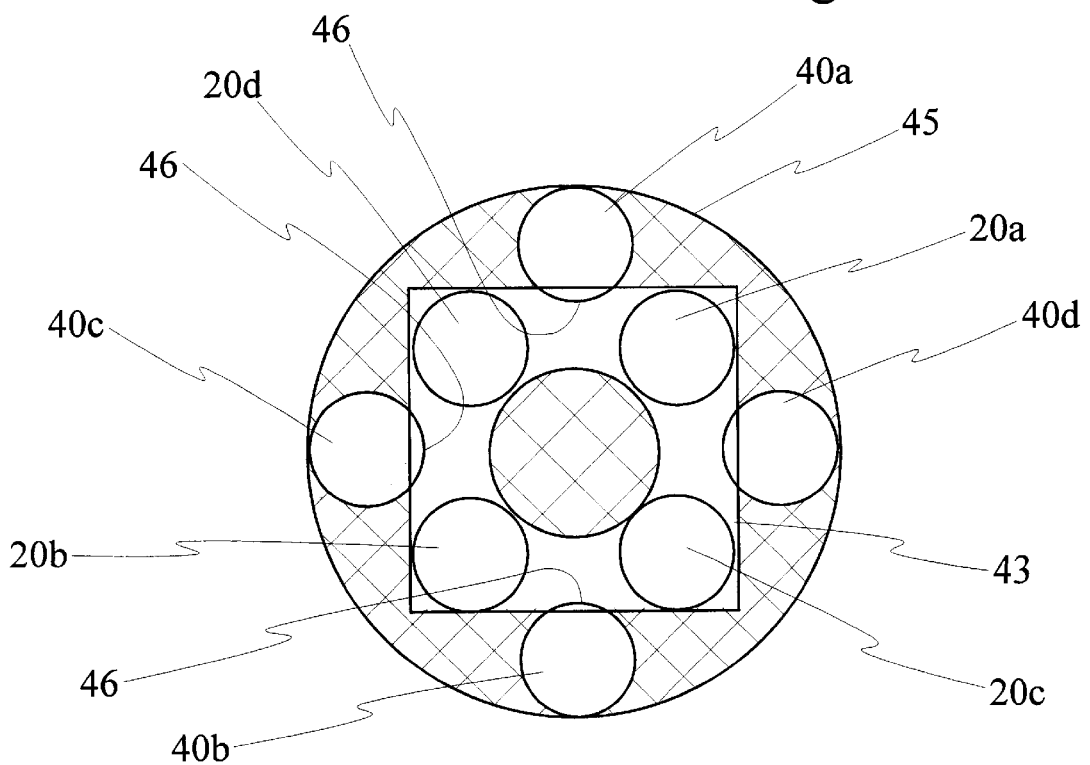
FIG. 4b is an end view of an alternative embodiment similar to that of FIG. 4a, wherein eight ports are provided, and further having a sleeve arrangement wherein eight fibres are accommodated.

Referring now to FIG. 4b, a fibre tube arrangement is shown, wherein a first group of fibres 20a . . . 20a is inserted into a first substantially square opening 43, and wherein a second group of optical fibres is inserted into openings 46 within the outer wall of the tube. A spacer element is provided between the four optical fibres within the square opening for accurately positioning and securing the four optical fibres.

Figure 5:
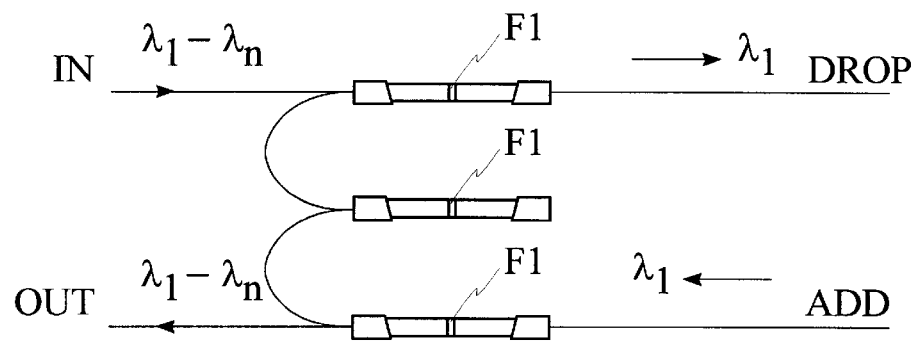
FIG. 5 is a schematic diagram of an add and drop optical circuit wherein twice filtering of an optical signal is performed.

In FIG. 5 a conventional add and drop optical circuit is shown, having three optical filters 50a, 50b, and 50c each comprising a filter element 12. The filters 12 are designed to have the same optical characteristics. In operation, an input optical signal comprising wavelengths λ1–λn is launched into the first filter element 50a and substantially most of the light of wavelength λ1 is passed through the filter. This light is said to be dropped. Light of wavelength λ2–λn and any remaining small portion of λ1 that does not pass through the filter element 12 is reflected and is directed via an optical fibre to the second filter 50b; this filter serves to providing extra level of filtering of light of wavelength λ1, thereby providing further isolation. Light of wavelength λ2–λn is reflected and directed into the third filter 50c where it is reflected backwards to an output port. At an opposite side of the filter 50c, an additional signal of wavelength λ1 is added such that the wavelengths λ1–λn are combined. Thus, in operation, the circuit drops channel 1 and subsequently addsa new channel 1. Providing additional isolation by twice filtering ensures that none of the information on the original channel 1 is mixed with the information carried by the added channel 1.

Figure 6:
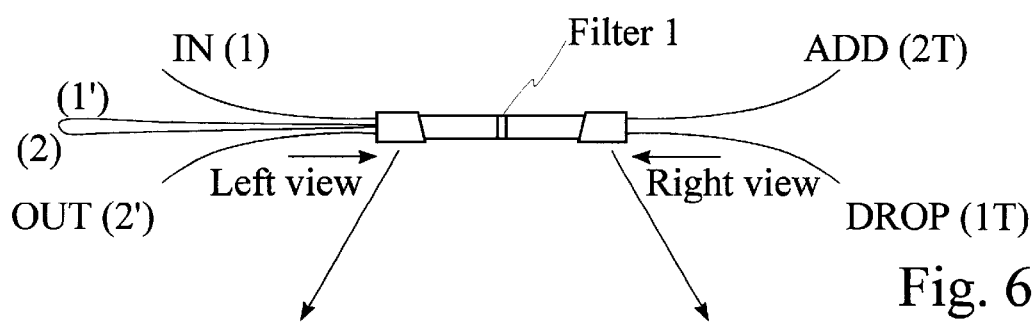
FIG. 6 is a schematic diagram of an add and drop circuit in accordance with the invention.
Figure 6A:
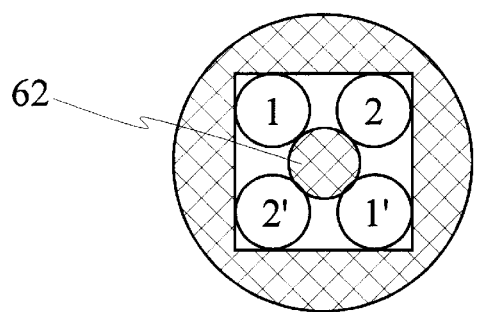
FIGS. 6a and 6b are end views of GRIN lenses of the add and drop circuit of FIG. 6.
Figure 6B:
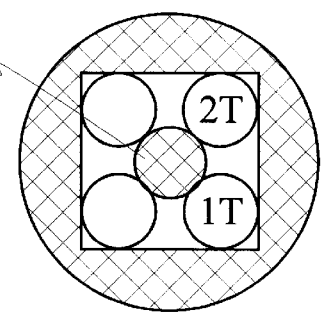

Turning now to FIGS. 6, 6a, and 6b an add and drop optical circuit is shown wherein a similar degree of isolation between dropped and added channels to that of FIG. 5 is provided using a single filter element 12.

Figure 6C:
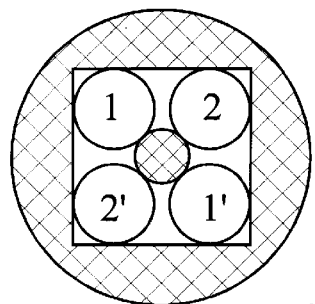
FIGS. 6c and 6d are end views similar to that of FIGS. 6a and 6b, wherein a smaller spacer element is utilized.
Figure 6D:
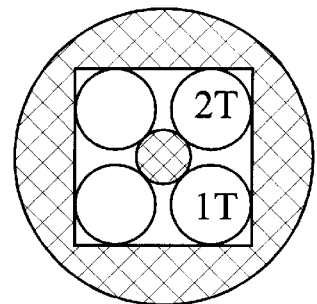

An input signal comprising a plurality of wavelengths is launched into the port labeled IN (1). Light that passes through the filter of a first predetermined wavelength is removed from the port labeled DROP (1T). Reflected light is routed in a backward direction and exits the port labeled 1'; via an optical fibre, this light is subsequently routed to the port 2. Light reflected by the filter is routed to the port 2'. Newly added light of the first predetermined wavelength is launched into the circuit via the port ADD(2T). FIG. 6b illustrates the port arrangement of the left side of the circuit and FIG. 6c illustrates the port arrangement of the right side of the circuit. Conveniently, a square fibre tube having a cylindrical spacer element 62 with a predetermined diameter is utilized lessening error that could be introduced by manually positioning the fibres. The diameter of the element 62 determines the angle ou upon which light launched into or out of the fibres 2, 2, 2', 1', will be incident upon the filter element 12, and hence, which wavelength of light will be dropped and added. Conveniently, a smaller spacer element is provided in the embodiment of FIGS. 6c and 6d. By changing the size of the spacer and hence the position of the fibres, the wavelength of light reflected and transmitted is also changed. Providing a smaller spacer will lessen the angle at which light is launched into the filter element.

Figure 7:
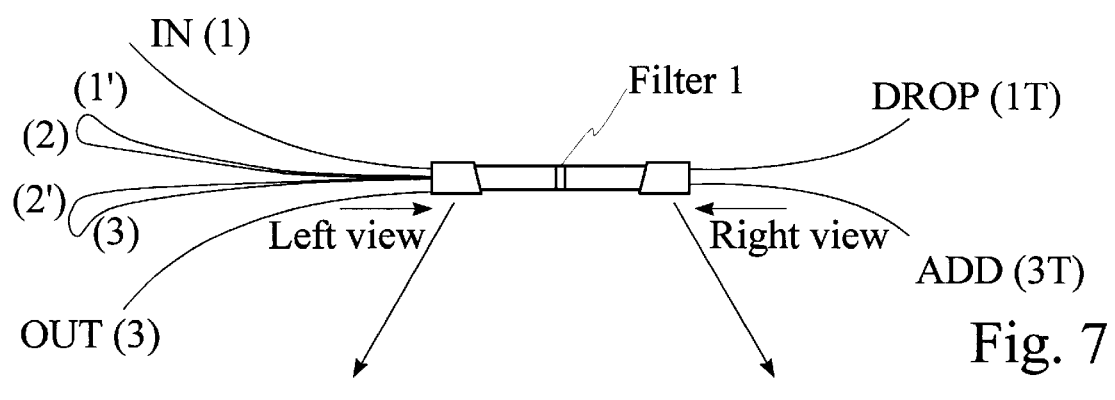
FIG. 7 is a schematic diagram of an add and drop circuit having additional ports providing a three pass filter.
Figure 7A:
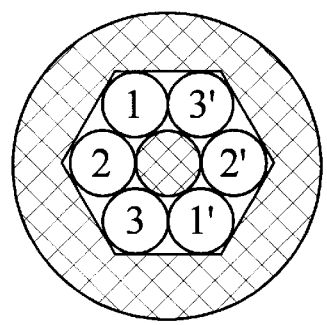
FIGS. 7a and 7b are end views of GRIN lenses of the add and drop circuit of FIG. 7.
Figure 7B:
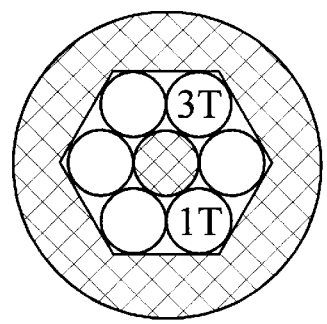

FIG. 7 illustrates an embodiment of an add and drop circuit wherein filtering of an optical signal is performed three times for increased isolation, using a same filter element 12. The add and drop circuit shown here functions in essentially the same manner as that shown in FIGS. 6, 6a, and 6b, however the optical signal is further filtered an additional time. In operation an input signal is launched into an input optical fibre labeled IN(1). This fibre is one of six optical fibres positioned in a first six-sided fibre tube 74 having a spacer element 62 disposed centrally and being coaxial with a GRIN lens to which it is coupled. Wavelengths of light other than a predetermined wavelength λ1 launched into IN and reflected by the filter at an angle α1 defined by the position of the fibres spaced about the element 62, follow the sequential path defined by fibres 1, 1', 2, 2', 3 and, 3', thereby being reflected by the filter element 12, three times. Light of wavelength α1 that passes through the filter upon a first pass, is coupled with the optical fibre labeled 1T at an opposite end of the circuit and the signal is DROPED. Any remaining light of wavelength λ1 that passes through the filter on subsequent passes, is extinguished by being directed to unused optical fibres on the right side of the circuit. In a similar manner to the circuit shown in FIG. 6, an ADD signal is provided to the same end of the circuit, to introduce a new signal of wavelength λ1. Alternatively, other signals of other wavelengths could be added by providing appropriately disposed ports at the same end of the circuit.

Figure 8A:
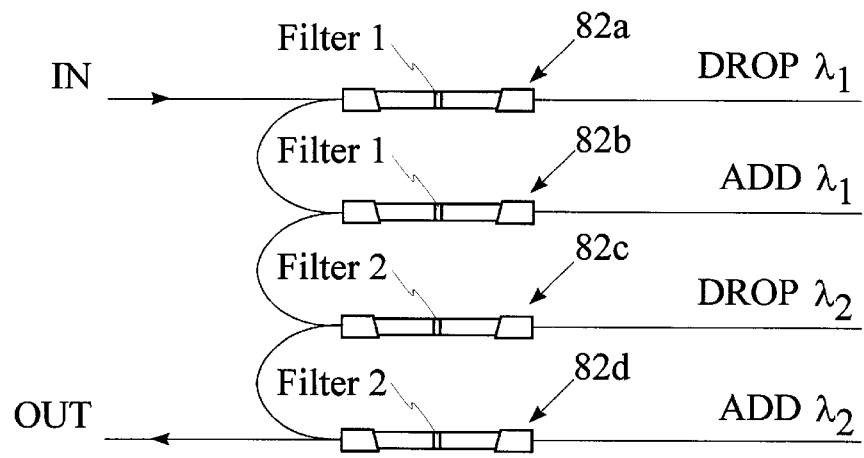
FIG. 8a is a schematic diagram of a conventional dual wavelength add and drop circuit.

In FIG. 8a a conventional two wavelength add and drop optical circuit is shown, wherein four conventional dichroic optical filters 82a, 82b, 82c, and 82d are shown optically coupled to one another. Light of wavelength λ1 is dropped by the first filter 82a after having been transmitted through it, and light of wavelength λ1 is added to the second filter 82b. Similarly light of wavelength λ2 is dropped by the filter 82c and is added to a same side of filter 82d.

Figure 8B:
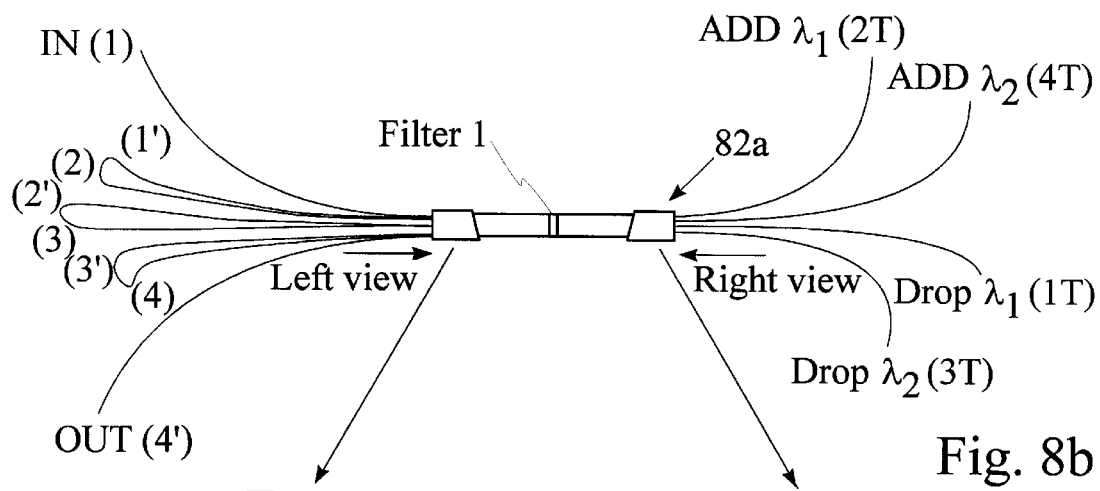
FIG. 8b is a schematic diagram of a dual wavelength add and drop circuit in accordance with this invention; and, FIGS. 8c and 8d are end views of GRIN lenses of the add drop circuit of FIG. 8b.

The same functionality is achieved in FIG. 8b using a single same, optical filter 82a with a different port arrangement. FIG. 8b functions in essentially the same manner as does filters described heretofore, for instance as in FIG. 6, however more ports are present and the adding and dropping of two wavelengths is possible.

Figure 8C:
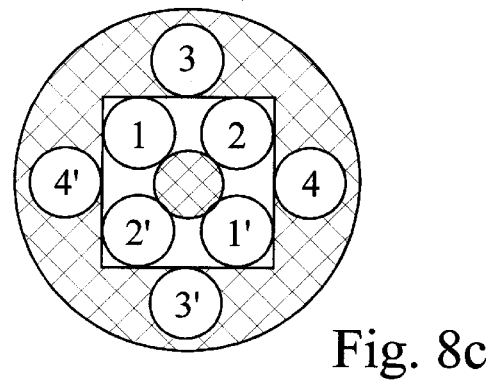
Figure 8D:
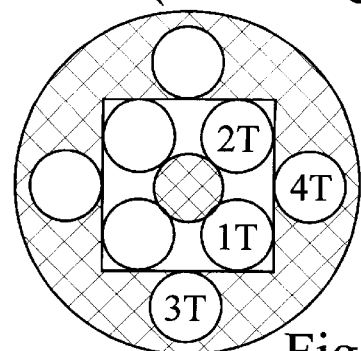

FIGS. 8c and 8d are end views of the fibre tubes coupled with the filter 82a of FIG. 8b.

Of course, numerous other embodiments may be envisaged, without departing from the spirit and scope of the invention.

What we claim is:

1. An optical filtering system comprising:
   a first GRIN lens having a first end face and a second end face;
   a plurality of ports at the first end face for launching light into or receiving light from the GRIN lens, said ports being spaced about an optical axis of the lens, at least four ports being disposed a same distance from the optical axis, wherein the ports are arranged in such a manner as to filter a signal having a first predetermined frequency at least two times;

a second GRIN lens disposed adjacent the first GRIN lens having a first end face and a second end face, wherein the first end face is a substantially focusing end, and the second end face is a substantially collimating end;

an optical filter element disposed between the first and second GRIN lens.

2. An optical filtering system as defined in claim 1, wherein the first and second GRIN lenses are substantially quarter pitch GRIN lenses.

3. A system as defined in claim 1 wherein the filtering system is configured as an add and drop optical circuit for adding and dropping at least a same channel.

4. An optical filtering system comprising:

a first GRIN lens having a first end face and a second end face;

a plurality of ports at the first end face for launching light into or receiving light from the GRIN lens, said ports being spaced about an optical axis of the lens, at least four ports being disposed a same distance from the optical axis;

a second GRIN lens disposed adjacent the first GRIN lens having a first end face and a second end face, wherein the first end face is a substantially focusing end, and the second end face is a substantially collimating end;

an optical filter element disposed between the first and second GRIN lens wherein the ports are arranged in such a manner as to reflect light of predetermined frequency incident upon the filter, two times.

5. An optical filtering system as defined in claim 4, further comprising waveguide means for coupling one of the at least four ports at the first end face of the first GRIN lens with another of the at least four ports at the first end face of the GRIN lens.

6. On optical filtering system as defined in claim 5, wherein the first end face of the second GRIN lens includes at least a port, optically coupled with one of the at least four ports at the first GRIN lens.

7. An optical filtering system comprising:

a first and second GRIN lens a wavelength selective optical filter element having a wavelength characteristic dependent upon on an angle of incidence, having an input end face and an output end face, said filter element being disposed between the first and second GRIN lens, the first GRIN lens having an input end face having at least 4 ports, wherein first and third ports are configured as input ports, and second and fourth ports are configured as output ports, the first, second, third and fourth ports being spaced apart and substantially equidistant from an optical axis of the first GRIN lens; and, means for coupling light from the second output port to the third input port for launching light received at the second port toward the optical filter element, wherein the means for coupling light from the second port to the third port comprises an optical waveguide disposed between the second and third port.

8. An optical filtering system as defined in claim 7, wherein the first and second ports are disposed on opposite sides of the optical axis, and wherein the third and fourth ports are disposed on opposite sides of the optical axis.

9. An optical filtering system as defined in claim 8, further comprising at least an output port at an end face of the second GRIN lens.

10. An optical filtering system as defined in claim 8, wherein the at least an output port is disposed a same distance from the optical axis of the second GRIN lens, as the first, second, third and fourth ports are, from the optical axis of the first GRIN lens.

11. An optical filtering system as defined in claim 10, wherein two ports are provided at the end face of the second GRIN lens for providing an add and drop optical device, for adding at least a first wavelength of light and for dropping at least the first wavelength of light.

12. An optical filtering system as defined in claim 8, wherein optical fibres are coupled to the ports at the end face of the lens, and wherein a spacer element is provided between the optical fibres at or near end faces thereof, for positioning the fibres in a predetermined manner.

13. An optical filtering system as defined in claim 12, wherein a tube is provided for housing the end faces of the optical fibres and for coupling the fibres to the end face of the GRIN lens.

14. An optical system as defined in claim 7 wherein the substantially equidistant at least four ports are disposed a distance $d_1$ and wherein four other ports are disposed a distance $d_2$ from the optical axis of the first GRIN lens.

15. An optical system as defined in claim 14, including optical fibres having ends disposed at the at least four ports and the at least four other ports.

16. An optical system as defined in claim 15, including means for spacing the optical fibres and for facilitating positioning of the optical fibres with a sleeve.

17. An optical system as defined in claim 7, including optical fibres having ends disposed at the at least four ports, the optical fibres being spaced by means provided for separating and spacing the fibres.

* * * * *

UNITED STATES PATENT AND TRADEMARK OFFICE
CERTIFICATE OF CORRECTION

PATENT NO. : 6,055,347

DATED : April 25, 2000

INVENTOR(S) :
Li et al

It is certified that error appears in the above-identified patent and that said Letters Patent is hereby corrected as shown below:

Col. 3, line 62, "o t" should read -- $\alpha$ --

Col 4, line 10, "oU" should read -- $\alpha_1$ --

Col. 6, line 4, "ou" should read -- $\alpha$ --

Signed and Sealed this

Twenty-fourth Day of April, 2001

Attest:

NICHOLAS P. GODICI

*Attesting Officer*   *Acting Director of the United States Patent and Trademark Office*